(No Model.)

M. B. SMYTH.
TIRE TIGHTENER.

No. 279,035. Patented June 5, 1883.

WITNESSES
H. J. Ennis
Wm. A. Garner

INVENTOR
Milton B. Smyth
per L. Deane
his Attorney

N. PETERS. Photo-Lithographer, Washington, D. C.

UNITED STATES PATENT OFFICE.

MILTON B. SMYTH, OF HOLTON, KANSAS.

TIRE-TIGHTENER.

SPECIFICATION forming part of Letters Patent No. 279,035, dated June 5, 1883.

Application filed March 24, 1883. (No model.)

*To all whom it may concern:*

Be it known that I, MILTON B. SMYTH, a citizen of the United States, residing at Holton, in the county of Jackson and State of Kansas, have invented certain new and useful Improvements in Tire-Tighteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
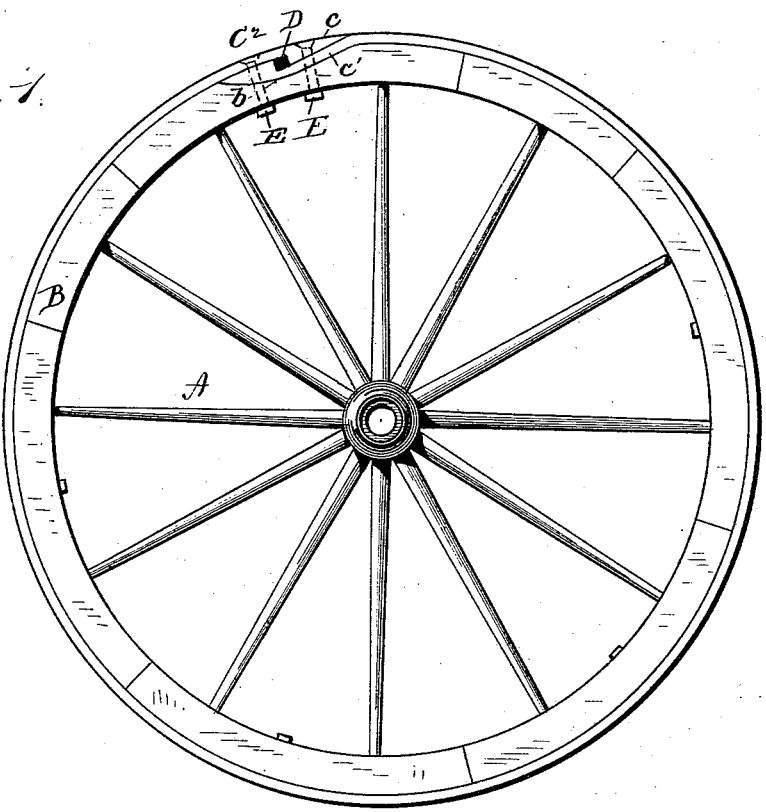
Figure 2:
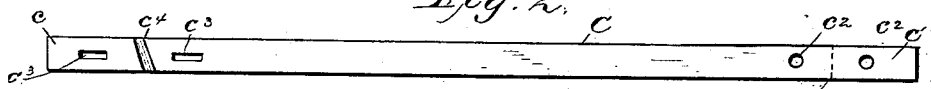
Figure 3:
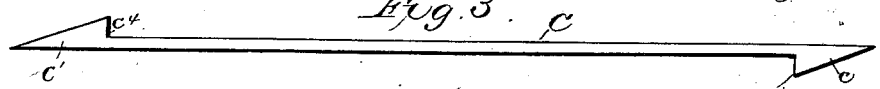
Figure 4:
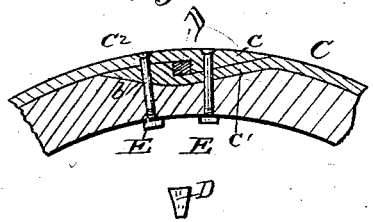

Figure 1 is a side elevation of a wheel having my invention; Fig. 2, a plan view of the tire; Fig. 3, edge views of the tire. Fig. 4 is a detail in vertical central section, showing how the parts are constructed and united.

This invention belongs to that class of devices known as "tire-tighteners;" and the novelty, in the present instance, consists of the detail of the construction, and in the combination of the several parts, all as will now be more fully and in detail set out and explained.

In the accompanying drawings, A denotes the wheel, B the felly, and C the tire. These several parts may be of any ordinary or usual construction, excepting as relates to the ends $c$ $c'$ of the tire and the modification of the felly to give a proper seat for said ends. The ends $c$ and $c'$ of the tire are sharp at the point and gradually thickened, so as to form the shoulders $c^4$ $c^5$, and thus from the point to the said shoulders will be somewhat triangular in longitudinal section. The ends so made are in general appearance shaped like a latch-head. One end of the tire, preferably the inner, has bolt-holes $c^2$, the other, preferably the outer, slots $c^3$ for the bolt. To afford a suitable seat on the felly for the matching and securing together of these two ends so made, the upper edge of the felly is cut away at $b$, as shown in Figs. 1 and 5.

To secure the tire upon the felly, it is bent as usual, and the end $c'$ is brought under $c$. These ends are not intended to fit together so that their latch-heads will positively lock, but rather so that a slight open space is left between the shoulders $c^4$ and $c^5$, respectively, on the ends $c$ and $c'$, (the shoulder $c^4$ being somewhat inclined,) and thus, when the two shoulders are in position, there is formed a seat for the wedge or key D. Into this space or seat is forced the wedge D, and thus the two ends of the tire can be brought together so as to lap and fit as closely and smoothly as can be desired. The bolts E, passing through the hole and slot in each end and the felly, will fix the ends rigidly upon each other and also to the felly. If it is necessary to further tighten the tire at any time, it can be done by loosening the nut which holds said bolts and knocking out the wedge or key. Then, by putting in a new key or wedge, or even by placing strips at the sides of the old wedge and driving the wedge home, the parts can be brought as close together as need be, when the bolts can be again tightened.

If desired, the shoulder $c^5$ may be inclined, but in a direction opposite to $c^4$, and thus there will be a wedge-shaped seat for the key—the key in either instance being made of proper shape to fit into the space between the said ends $c^4$ and $c^5$.

The device is very simple in structure, very cheaply made, easily applied, and very durable.

Having now described my invention, what I claim is—

1. The wheel-tire C, having ends $c$ $c'$, sharp at the points, and provided with bolt-holes $c^2$ and slots $c^3$, and thickened to form shoulders $c^4$ and $c^5$ near said ends, substantially as described.

2. The wheel-tire C, having sharpened ends $c$ $c'$, thickened at $c^4$ and $c^5$ to form shoulders, and provided with bolt-holes and slots, combined with wedge D, bolt E, and wheel A, substantially in the manner described.

In testimony whereof I affix my signature in presence of two witnesses.

MILTON BURWELL SMYTH.

Witnesses:
A. M. SEATON,
W. R. FISHER.